(12) United States Patent
Tinoco

(10) Patent No.: US 10,415,747 B1
(45) Date of Patent: Sep. 17, 2019

(54) BRACKETS AND ASSEMBLIES FOR ATTACHING OBJECTS TO SURFACES IN VEHICLES

(71) Applicant: The Boeing Company, Chicago, IL (US)

(72) Inventor: Joseph I. Tinoco, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/915,314

(22) Filed: Mar. 8, 2018

(51) Int. Cl.
| | |
|---|---|
| F16M 13/00 | (2006.01) |
| F16M 13/02 | (2006.01) |
| F16B 2/22 | (2006.01) |
| B64D 11/00 | (2006.01) |
| B64D 11/06 | (2006.01) |

(52) U.S. Cl.
CPC ............ *F16M 13/02* (2013.01); *B64D 11/00* (2013.01); *B64D 11/0015* (2013.01); *B64D 11/0696* (2013.01); *F16B 2/22* (2013.01)

(58) Field of Classification Search
CPC ................ F16M 13/02; B64D 11/0015; B64D 11/0696; F16B 2/22
USPC ..... 248/500, 501, 503, 506, 222.41, 223.21, 248/505
See application file for complete search history.

(56) References Cited

U.S. PATENT DOCUMENTS

| | | | | |
|---|---|---|---|---|
| 818,700 | A * | 4/1906 | Morewood | |
| 1,450,183 | A * | 4/1923 | Moon | A47B 21/04 248/680 |
| 3,159,368 | A * | 12/1964 | Ahlbin | B66D 3/02 224/520 |
| 3,894,377 | A * | 7/1975 | Welch | F16B 12/22 403/353 |
| 4,178,047 | A * | 12/1979 | Welch | F16B 12/22 108/60 |
| 4,473,316 | A * | 9/1984 | Welch | F16B 12/22 248/222.41 |

* cited by examiner

*Primary Examiner* — Gwendolyn W Baxter
(74) *Attorney, Agent, or Firm* — McDonnell Boehnen Hulbert Berghoff LLP

(57) ABSTRACT

Brackets for attaching objects to surfaces are described. One bracket includes a first leg that is attachable to the surface and a second leg that is attachable to the object. The object-facing side includes a slot extending through an object facing-side of the second leg. The slot is configured to receive a fastener for attaching the second leg to the object. Along a length of the slot, a width of the slot tapers from a first width at a first position along the length of the slot to a second width at a second position along the length of the slot. The second width is narrower than the first width. Methods for attaching objects to surfaces are also described.

19 Claims, 8 Drawing Sheets

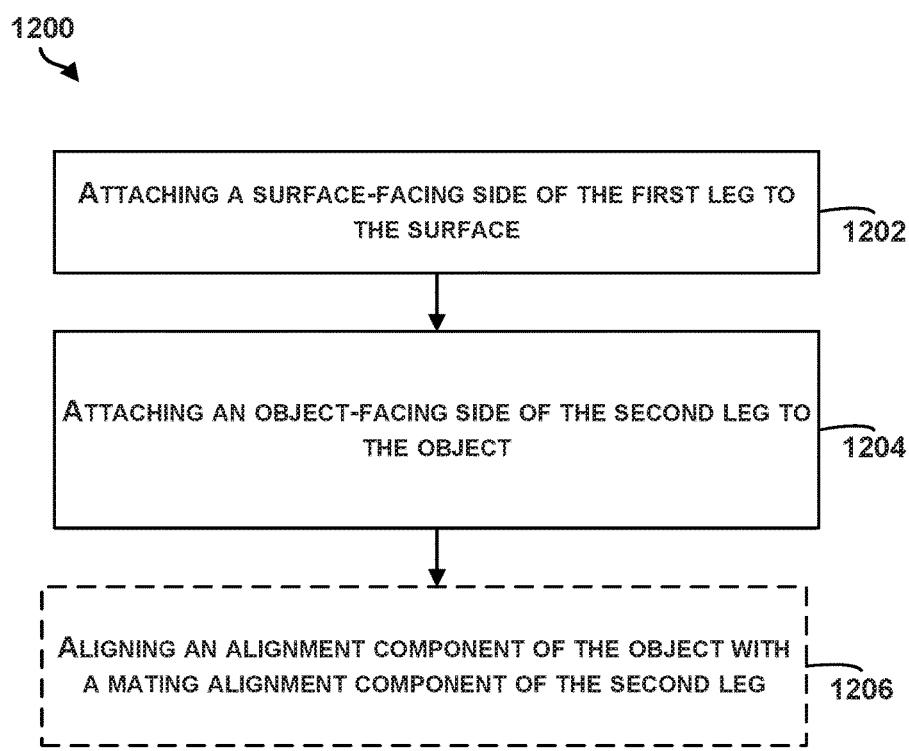

BRACKETS AND ASSEMBLIES FOR ATTACHING OBJECTS TO SURFACES IN VEHICLES

FIELD

The present disclosure relates generally to brackets, and more particularly, to brackets and assemblies for attaching objects to surfaces in vehicles.

BACKGROUND

Wall-mounted objects in a moving vehicle can experience acceleration or deceleration loads as the vehicle accelerates or decelerates. One example of such an object is an occupant seat mounted to a partition in an aircraft. Another example of such an object is a stowage compartment or a video monitor mounted to a partition in an aircraft. If a partition to which one of these objects is mounted is relatively flexible, the acceleration or deceleration applied to the object can sometimes be problematic. For instance, when the level of acceleration or deceleration exceeds levels experienced during normal operation of the vehicle, the acceleration or deceleration can generate excessive loads at the attachment points between the object and the partition.

By way of example, an occupant seat can be mounted to a flexible partition in an aircraft. When the aircraft decelerates rapidly, the deceleration of the aircraft can create bending of the partition towards the direction that the aircraft is traveling, due to the tendency of the occupant seat to keep moving in the direction that the aircraft is traveling. The bending of the partition, in turn, can create a curved surface on the partition where the occupant seat is attached. Further, the occupant seat, being a fairly rigid structure with multiple fixed attachment points, may be unable to bend to the same degree as the partition, generating loads at the attachment points. In some examples, the excessive loads can cause the occupant seat to at least partially detach from the partition at one or more of the attachment points.

SUMMARY

In one example, a bracket for attaching an object to a surface is described. The bracket includes a first leg that is attachable to the surface. The first leg has a first free end and a surface-facing side. The bracket also includes a second leg that is attachable to the object and extends from the first leg at a junction point. The second leg has a second free end and an object-facing side. The object-facing side includes a slot extending through the object facing-side. The slot is configured to receive a fastener for attaching the second leg to the object. Along a length of the slot, a width of the slot tapers from a first width at a first position along the length of the slot to a second width at a second position along the length of the slot. The second width is narrower than the first width, and the first position is located between the junction point and the second position.

In another example, an assembly for a vehicle is described. The assembly includes a partition having a surface, an object having a structural portion, and a bracket attaching the structural portion of the object to the partition. The bracket includes a first leg that is attachable to the surface of the partition. The first leg has a first free end and a surface-facing side. The bracket also includes a second leg that is attachable to the structural portion of the object and extends from the first leg at a junction point. The second leg has a second free end and an object-facing side. The object-facing side includes a slot extending through the object-facing side. The slot is configured to receive a fastener for attaching the second leg to the structural portion of the object. Along a length of the slot, a width of the slot tapers from a first width at a first position along the length of the slot to a second width at a second position along the length of the slot. The second width is narrower than the first width, and the first position is located between the junction point and the second position.

In still another example, a method for attaching an object to a surface using a bracket is described. The bracket includes a first leg that is attachable to the surface and a second leg that is attachable to the object and extends from the first leg at a junction point. The method includes attaching a surface-facing side of the first leg to the surface. The method also includes attaching an object-facing side of the second leg to the object by inserting a fastener through a slot that extends through the object-facing side of the second leg and securing the object-facing side of the second leg to the object. Along a length of the slot, a width of the slot tapers from a first width at a first position along the length of the slot to a second width at a second position along the length of the slot. The second width is narrower than the first width and narrower than a diameter of the fastener. Further, the first position is located between the junction point and the second position.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 12 shows a flowchart of an example method for attaching an object to a surface using a bracket, according to an example embodiment.

DETAILED DESCRIPTION

Figure 1:
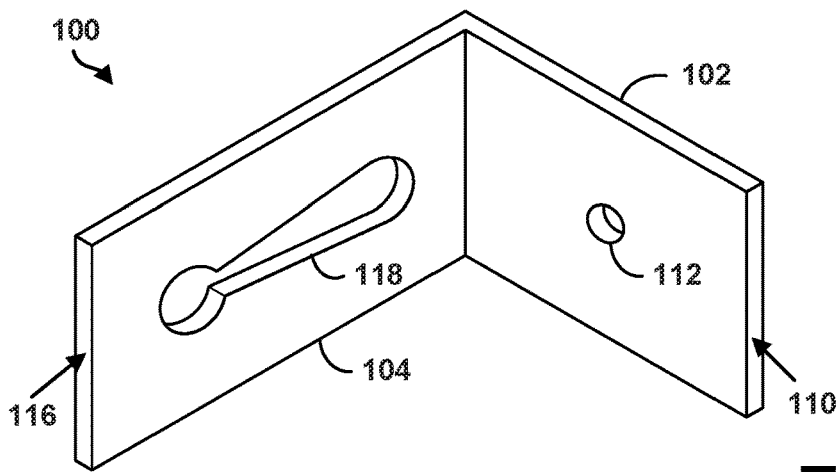
FIG. 1 illustrates a perspective view of an example bracket, according to an example embodiment.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are brackets and assemblies for attaching objects to surfaces in a vehicle as well as methods for attaching objects to surfaces in a vehicle using brackets and assemblies. One example bracket includes a first leg that is attachable to a surface in a vehicle and a second leg that is attachable to an object and extends from the first leg at a junction point. The second leg includes a slot configured to receive a fastener for attaching the second leg to the object. Further, along a length of the slot, a width of the slot tapers from a first width at a first position along the length of the slot to a second width at a second position along the length of the slot. The second width is narrower than the first width.

The bracket is configured to dampen deceleration loads applied to the object by converting displacement of the object away from the surface into a load-dampening interference fit between the fastener and the slot in the bracket. By way of example, the surface that the first leg is attached to can be a flexible surface, and the object can be attached to the surface by the bracket. For instance, a fastener can be inserted into the slot and through a hole in the object. When a deceleration load is applied to the object, the deceleration load can cause the object to move away from the surface while the bracket remains attached to the surface. As the object moves away from the surface, the fastener can move with the object and slide within the slot. The bracket is configured such that, as the fastener slides within the slot, the fastener widens the slot into a width that is equal to a diameter of the fastener. For example, the fastener can extrude or plastically deform the slot. This deformation process controls the displacement of the object away from the surface and also dampens the displacement load applied to the bracket.

In some examples, the slot tapers from the first width to the second, narrower width, and then ends in a widened end having a width that is wider than the second width. For instance, the first width and the width of the widened end can be wider than or equal to a diameter of a fastener that the slot is configured to receive. With this arrangement, the widened end provides a final maximum displacement position for the fastener, and provides stress relief at the end of the slot. Hence, the widened end can help avoid structural failure of the bracket at the end of the slot.

In some examples, the second leg of the bracket includes a shear pin. The shear pin can engage with a hole in the object when the second leg of the bracket is initially attached to the object. By engaging with the hole, the shear pin can help prevent the bracket from rotating relative to the object. Further, by engaging with the hole, the shear pin also can provide initial resistance to deceleration loads that are less than a threshold. When a deceleration load that exceeds the threshold is applied to the object, the bracket can displace relative to the object, shearing off the shear pin. After shearing of the shear pin, the fastener can move along the length of the slot, expanding and deforming the slot. Additionally or alternatively, the object can include a shear pin and the bracket can include a hole that is engaged by the shear pin when the second leg of the bracket is initially attached to the object.

Various other features of the brackets and methods for attaching objects to surfaces using the brackets are also described hereinafter with reference to the accompanying figures.

Figure 2:
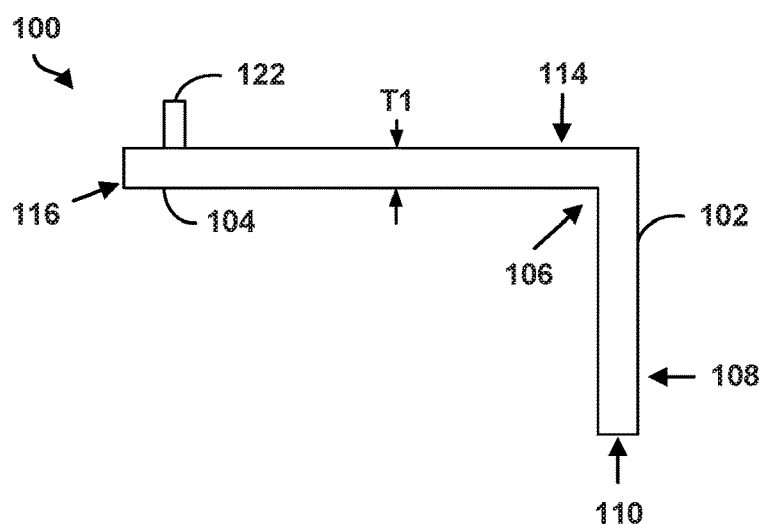
FIG. 2 illustrates a top view of the example bracket of FIG. 1.
Figure 3:
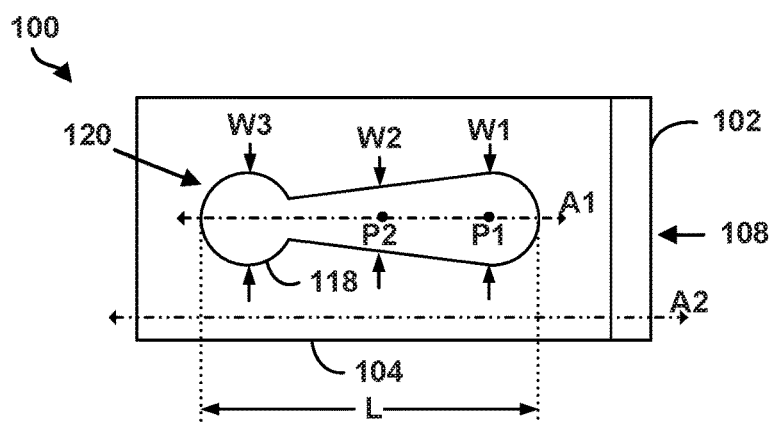
FIG. 3 illustrates a side view of the example bracket of FIGS. 1 and 2.

Referring now to FIGS. 1-3, an example bracket 100 is illustrated. In particular, FIG. 1 illustrates a perspective view of bracket 100, FIG. 2 illustrates a top view of bracket 100, and FIG. 3 illustrates a side view of bracket 100.

As shown in FIG. 1, the bracket 100 includes a first leg 102 and a second leg 104. The second leg 104 extends from the first leg 102 at a junction point 106. Although the bracket 100 is illustrated in FIGS. 1-3 as an L-shaped bracket with the junction point 106 being near an end of the first leg 102 and the first leg 102 being orthogonal to the second leg 104, the example is not meant to be limiting. In other examples, the junction point 106 may be closer to a midpoint of the first leg 102. For instance, the bracket 100 may be a T-shaped bracket with the junction point 106 being at or near a midpoint of the bracket 100 (not shown). Additionally or alternatively, the angle between the first leg 102 and the second leg 104 can be greater than 90 degrees (e.g., 95 degrees or 110 degrees) or less than 90 degrees (e.g., 85 degrees or 75 degrees). In practice, the angle between the first leg 102 and the second leg 104 can vary depending on the desired orientation between an object, such as an object 403 (shown in FIG. 4) and a surface of a partition, such as a partition 402 (shown in FIG. 4) to which the bracket 100 is intended to attach the object.

Figure 4:
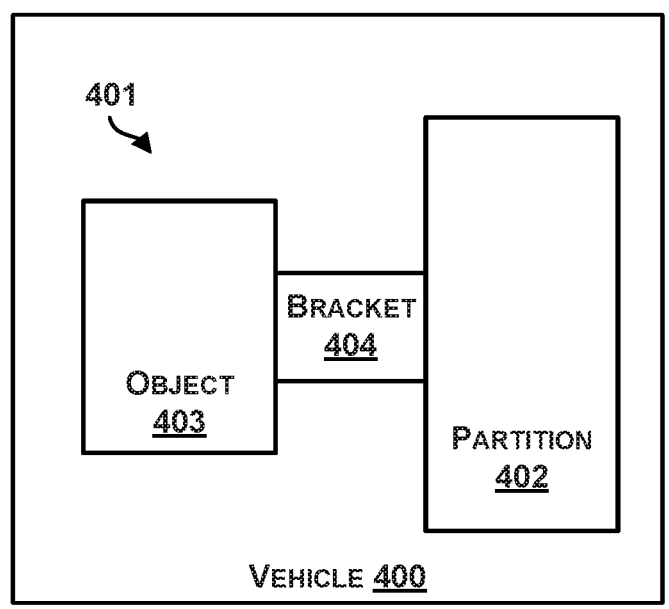
FIG. 4 is a block diagram of an example vehicle including an example assembly, according to an example embodiment.

In line with the discussion above, the first leg 102 is attachable to a surface, such as a surface of a partition 402 in a vehicle 400 (shown in FIG. 4). The first leg 102 includes a surface-facing side 108 and a first free end 110. The first free end 110 is the end of the first leg 102 that is furthest away from the junction point 106. The first leg 102 includes a hole 112 that extends through the surface-facing side 108. The hole 112 is configured to receive a fastener, such as a fastener 610 (shown in FIG. 7), for attaching the first leg 102 to the surface.

Further in line with the discussion above, the second leg 104 is attachable to an object, such as an occupant seat, a stowage compartment, or a video monitor. The second leg 104 includes an object-facing side 114 and a second free end 116. The object-facing side 114 is a side of the second leg 104 that is configured to abut an object to which the bracket 100 attaches to a surface. Although the object-facing side 114 is illustrated as the top side of the second leg 104 in FIG. 2, in other examples, the object-facing side 114 could be the bottom side of the second leg 104.

The second leg 104 also includes a slot 118 configured to receive a fastener, such as a fastener 612 (shown in FIG. 7) for attaching the second leg 104 to the object. Along a length L of the slot 118, a width of the slot 118 tapers from a first width W1 at a first position P1 along the length L of the slot 118 to a second width W2 at a second position P2 along the length of the slot 118. The first position P1 is located between the junction point 106 and the second position P2. Further, the second width W2 is narrower than the first width W1.

As described more fully below, the slot 118 is configured to receive a fastener having a diameter, such as a diameter D1 (shown in FIG. 7), that is wider than the second width W2 but narrower than or equal to the first width W1. The slot 118 is configured to receive the fastener at the first position P1. Because the second width W2 is narrower than the diameter of the fastener, movement of the fastener along the slot towards the second free end 116 results in an interference fit between the fastener and the slot 118.

The length of the slot 118 can vary depending on the maximum anticipated curvature of the surface to which the object is attached and, in turn, the maximum anticipated displacement of the object relative to the wall due to the curvature of the surface. For instance, if the maximum anticipated displacement of the object relative to the wall is two inches (0.0508 meters), the length of the slot can be two inches (0.0508 meters). In one example, a distance between the first position P1 and the second position P2 can be greater than the first width W1.

The orientation of the slot 118 along the second leg 104 can also differ from the orientation depicted in FIGS. 1-3. In FIGS. 1-3, a longitudinal axis A1 of the slot 118 is parallel to a longitudinal axis A2 of the second leg 104. In other examples, the longitudinal axis A1 of the slot 118 can be oriented at an oblique angle to the longitudinal axis A2 of the second leg 104. Orienting the longitudinal axis A1 of the slot 118 oblique to the longitudinal axis A2 of the second leg 104 can allow the slot 118 to guide an object away from a surface along a trajectory that is oblique to the longitudinal axis A2.

The bracket 100 can be made of a ductile material, such as aluminum, steel, or plastic, that provides a rigid attachment of the object to the surface under normal deceleration loads while allowing displacement of the fastener along the slot 118 when deceleration loads exceed a threshold. The amount of taper of the width of the slot 118 along the length L of the slot 118 can differ from the amount of taper shown in FIGS. 1-3 depending, for example, on the strength of the material from which the bracket 100 is made and the threshold. Decreasing the amount of taper, in other words, decreasing the rate at which the width of the slot 118 decreases along the length of the slot, can allow the slot 118 to be more easily or quickly deformed by a fastener. Similarly, a thickness T1 of the second leg 104 can affect the speed with which a fastener deforms the slot 118 and, hence, the relative speed between the object and the surface. For instance, decreasing the thickness T1 can allow the slot 118 to be more easily or quickly deformed by a fastener.

As further shown in FIGS. 1-3, the slot 118 includes a widened end 120 having a width W3 that is wider than the second width W2. The widened end 120 is the end of the slot 118 that is located closer to the second free end 116 than the junction point 106. In some examples, the width W3 of the widened end 120 can be the same as the first width W1. The widened end 120 provides a final maximum displacement position for the fastener when the fastener moves along the slot 118. Further, the widened end 120 provides stress relief at the end of the slot 118. In this manner, the widened end 120 can help avoid structural failure of the bracket 100 at the end of the slot 118. For instance, the presence of the widened end 120 can help to prevent the fastener from cracking or splitting the bracket 100 at the second free end 116.

The second leg 104 can also include a shear pin 122 extending from the object-facing side 114. The shear pin 122 can engage with a hole, such as a hole 614 (shown in FIG. 8) in the object that the bracket attaches to the surface. By engaging with the hole in the object, the shear pin 122 can help prevent the bracket 100 from rotating relative to the object. For instance, the positioning of the fastener through the slot 118 can provide a first index point between the second leg 104 and the object. The engagement between the shear pin 122 and the hole in the object can then provide a second index point between the object and the second leg 104. Together, the first index point and the second index point can prevent the object from rotating relative to the second leg 104.

The shear pin 122 can be made of a relatively soft material, such as aluminum, and can be machined to be integrally formed with the second leg 104. Further, by engaging with the hole, the shear pin 122 can provide initial resistance to deceleration loads that are less than a threshold. When a deceleration load that exceeds the threshold is applied to the object, the bracket 100 can displace relative to the object, shearing off the shear pin. After shearing the shear pin 122, the fastener can then move along the length of the slot 118, expanding and deforming the slot 118.

Additionally or alternatively, the object can include a shear pin and the bracket 100 can include a hole that is engaged by the shear pin when the second leg 104 of the bracket 100 is initially attached to the object.

FIG. 4 is a block diagram of an example vehicle 400 including an example assembly 401. The vehicle 400 may be any type of vehicle, such as an aerial vehicle, marine vehicle, or terrestrial vehicle. As shown in FIG. 4, the assembly 401 includes a partition 402, an object 403, and a bracket 404.

The partition 402 can be a flexible partition. For instance, the partition 402 can have a panel that is flexible. The object 403 can be an object that is mounted to the partition 402, such as an occupant seat, a stowage compartment, or a video monitor. The bracket 404 may represent the bracket 100 of FIGS. 1-3 or any of the brackets described herein. The bracket 404 can attach a structural portion of the object 403, such as a structural portion 608 (shown in FIG. 6), to a surface of the partition 402, such as a surface 604 (shown in FIG. 6). Although only a single bracket 404 is shown, in other examples, the assembly 401 may include multiple brackets 404 attaching the structural portion of the object 403 to the surface of the partition 402.

Figure 5:
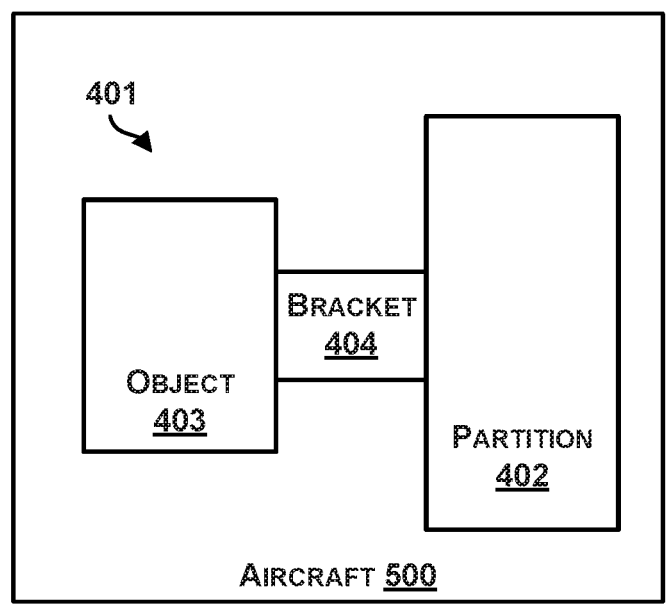
FIG. 5 is a block diagram of an example aircraft including the example assembly of FIG. 4.

FIG. 5 is a block diagram of an example aircraft 500 including the example assembly 401 of FIG. 4. In addition to the assembly 401, the aircraft 500 can include additional components, such as a propulsion system and an electrical system.

Figure 6:
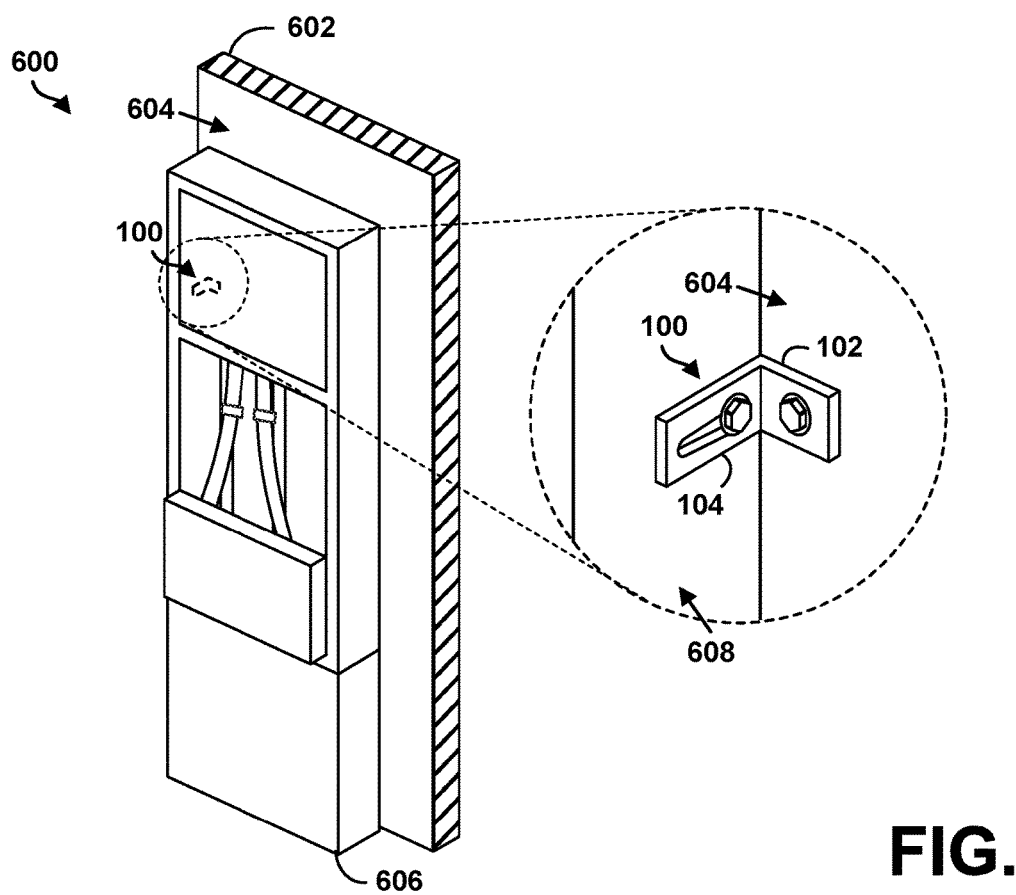
FIG. 6 illustrates a perspective view of an example assembly for a vehicle, including the example bracket of FIGS. 1, 2, and 3.
Figure 7:
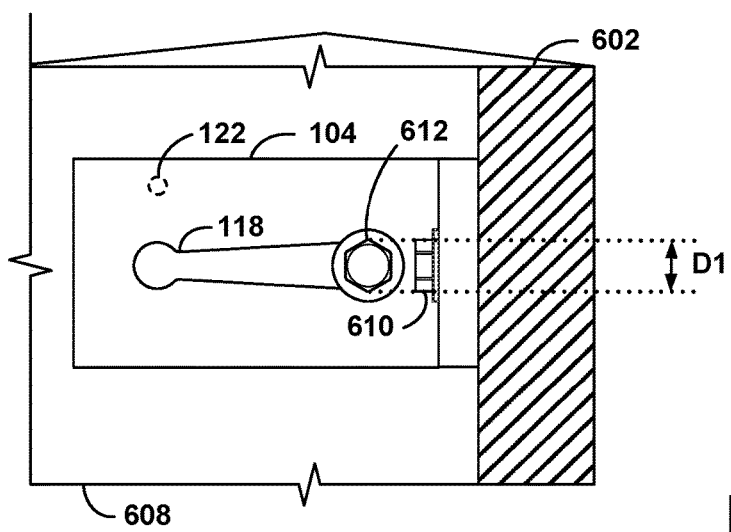
FIG. 7 illustrates a partial cutaway side view of the example assembly of FIG. 6.

FIG. 6 illustrates a perspective view of an example assembly 600 utilizing the bracket 100. And FIG. 7 illustrates a partial cutaway side view of the example assembly 600 of FIG. 6. The assembly 600 may be an assembly of a vehicle. For instance, the assembly 600 may represent the assembly 401 shown in FIGS. 4 and 5.

As shown in FIGS. 6 and 7, the assembly 600 includes a partition 602 having a surface 604 to which an occupant seat 606 is attached. The partition 602 can be flexible. For example, the partition 602 may have or be a panel that is flexible, and the surface 604 can be a surface of the panel. The partition 602 can flex towards a direction of travel when the vehicle in which the assembly 600 is installed decelerates.

The occupant seat 606 can be a flight attendant jump seat. The occupant seat 606 includes a structural portion 608 for attaching the occupant seat 606 to the surface 604.

As further shown in FIGS. 6 and 7, the bracket 100 attaches the structural portion 608 of the occupant seat 606 to the surface 604 of the partition 602. Specifically, the first leg 102 of the bracket 100 is attached to the surface 604 using a fastener 610. Further, the second leg 104 of the bracket 100 is attached to the structural portion 608 using a fastener 612 that is received within the slot 118. In FIGS. 6 and 7, the fastener 610 and the fastener 612 are each illustrated as a bolt; however, the fasteners 610, 612 can be any suitable mechanical fastener. When the fastener 610 is a bolt, a first washer is provided between the fastener 610 and the first leg 102. And a second washer is provided between the fastener 612 and the second leg 104. In the assembled position, the structural portion 608 is oriented perpendicular to the surface 604 of the partition 602; however, the structural portion 608 can be at any suitable angle to the surface 604 depending on the geometry of the bracket 100.

A diameter D1 of the fastener 612 is narrower than the first width W1 of the slot 118 at the first position P1 where the fastener 612 is received within the slot 118. In other examples, the diameter D1 of the fastener 612 can be equal to the first width W1 of the slot 118. The width of the slot 118 tapers along the length L of the slot 118 to the second width W2 at the second position P2, with the second width W2 being narrower than the diameter D1 of the fastener 612.

The shear pin 122 of the bracket 100 is received within a hole, such as a hole 614 (shown in FIG. 8), in the structural portion 608. The shear pin 122 can be aligned with the hole in the structural portion 608 when the second leg 104 is attached to the structural portion 608.

Figure 8:
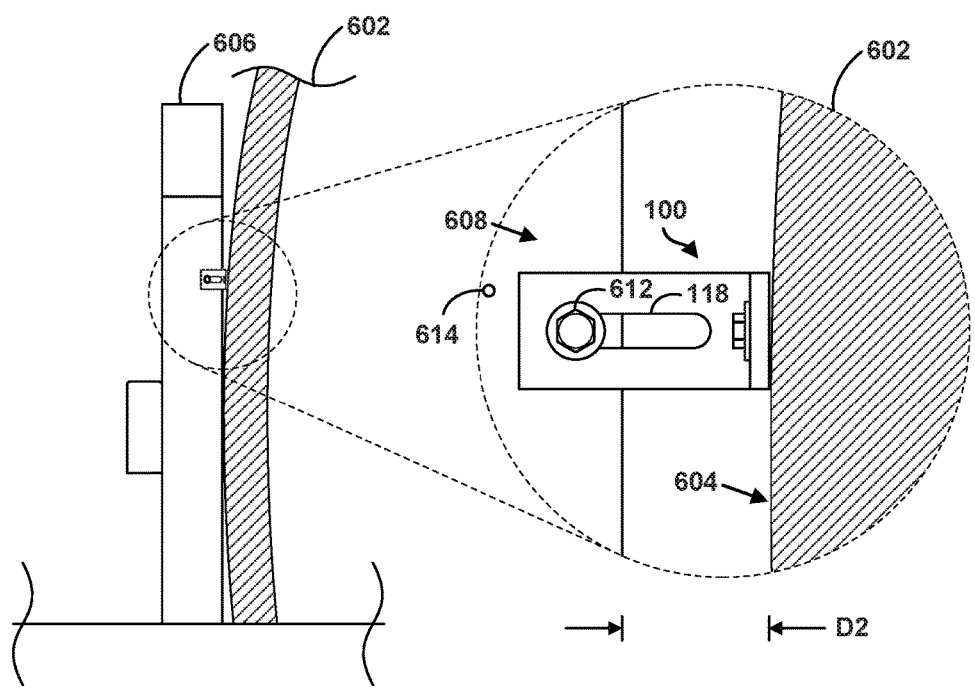
FIG. 8 illustrates a cutaway side view of the example assembly of FIGS. 6 and 7.

FIG. 8 illustrates a cutaway side view of the assembly 600 of FIGS. 6 and 7. In particular, FIG. 8 illustrates a view of the assembly 600 while a significant deceleration load is applied to the partition 602 and the object 403, such as the occupant seat 606. As shown in FIG. 8, the deceleration load causes the partition 602 to flex, creating a bending of the surface 604. The bending of the surface 604, in turn, causes the occupant seat 606 to displace from the surface 604 by a displacement distance D2. As the occupant seat 606 moves away from the surface 604, the fastener 612 moves with the occupant seat 606 and along the slot 118. While the fastener 612 slides along the slot 118, the fastener 612 widens the width of the slot 118 to the diameter D1 of the fastener 612. The fastener 612 can widen the slot 118 by deforming or extruding the slot 118, thereby dissipating force applied to the bracket 100. For example, as the slot 118 widens, the slot 118 dampens the displacement load applied to the bracket 100.

A hole 614 in the structural portion 608 that the shear pin 122 was originally received within is shown in FIG. 8. The hole 614 no longer aligns with the position of the shear pin 122 on the second leg 104, due to displacement of the occupant seat 606 with respect to the second leg 104.

Although only a single bracket 100 is shown in FIGS. 6-8 for ease of explanation, there can be multiple brackets 100 distributed along the height of the occupant seat 606 for attaching the structural portion 608, or similar structural portions, to the surface 604.

Further, although FIG. 6 illustrates the manner in which a partition may flex when an object, such as a forward-facing occupant seat, is attached to the surface of the partition, the bracket 100 may also provide a similar dampening of deceleration loads when the bracket 100 is used to attach an aft-facing object, such as an aft-facing occupant seat, to an aft surface of a partition. In such an arrangement, when a deceleration load is applied to the partition, the partition may still flex, causing a bending of the aft surface of the partition towards a direction of travel. This bending of the aft surface can, in turn, cause a displacement of the aft-facing object away from the aft surface of the partition at one or more attachment points between the aft-facing object and the aft surface. Upon displacement of the aft-facing object away from the aft surface, a fastener received within the slot 118 of the bracket 100 can slide along the slot 118 and widen the slot 118, thereby dissipating force applied to the bracket 100 as described above. Hence, the bracket 100 can also be used to dampen deceleration loads when the bracket 100 attaches an aft-facing object to an aft surface of a partition.

Figure 9:
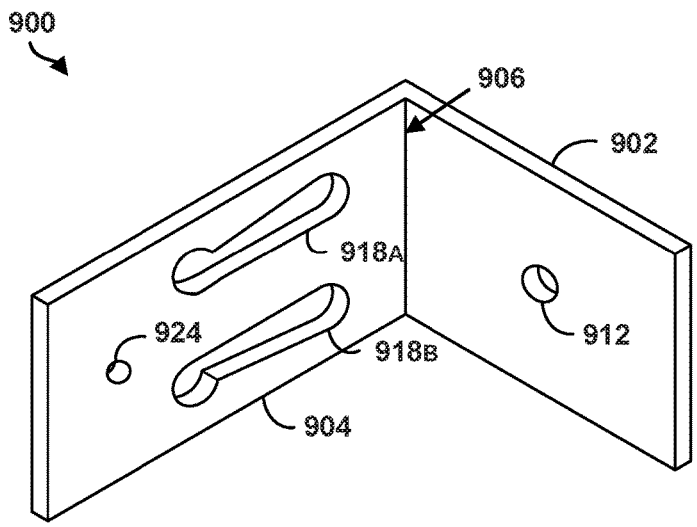
FIG. 9 illustrates a perspective view of another example bracket, according to an example embodiment.
Figure 10:
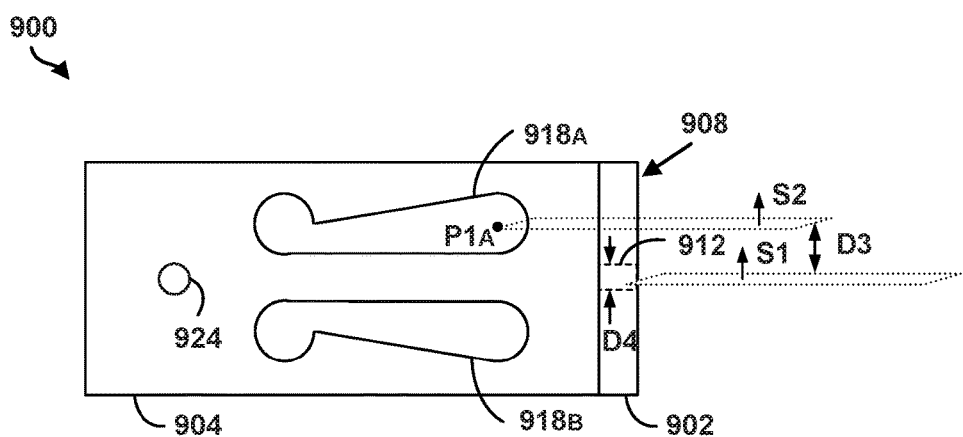
FIG. 10 illustrates a side view of the example bracket of FIG. 7.

FIGS. 9 and 10 illustrate another example bracket 900. In particular, FIG. 9 illustrates a perspective view of the bracket 900. And FIG. 10 illustrates a side view of the bracket 900. Similarly to the bracket 100 of FIGS. 1-3 and 6-8, the bracket 900 includes a first leg 902 and a second leg 904. The second leg 904 extends from the first leg 902 at a junction point 906. Further, like the first leg 102 of FIGS. 1-3 and 6-8, the first leg 902 includes a surface-facing side 908 and a hole 912 that is configured to receive a fastener, such as the fastener 610 (shown in FIG. 7) for attaching the first leg 902 to a surface, such as the surface 604 (shown in FIG. 7).

However, unlike the second leg 104 of FIGS. 1-3 and 6-8, the second leg 904 includes two slots 918a, 918b. Each of the slots 918a, 918b can be similar to the slot 118 of FIGS. 1-3 and 6-8. By having two slots 918a, 918b, the bracket 900 can dissipate twice as much force as the amount of force that the bracket 100 can dissipate.

Inner sides of the two slots 918a, 918b, in other words, the side of the slots 918a, 918b facing each other, can be parallel. Whereas, the outer sides of the two slots 918a, 918b are oriented at an angle to the respective inner sides, such that the respective widths of the slots 918a, 918b taper along respective lengths of the slots 918a, 918b. With this arrangement, as respective fasteners slide along the slots 918a, 918b, the fasteners can displace material of the second leg 904 towards the outer edges of the second leg 904. For instance, a fastener sliding along the slot 918a can displace material of the second leg 904 towards the top edge of the second leg 904, and a fastener sliding along the slot 918b can displace material of the second leg 904 towards a bottom edge of the second leg 904.

The hole 912 is arranged within a first plane S1 that is orthogonal to the surface-facing side 908 of the first leg 902. The first position P1a along the length of the slot 918a is arranged within a second plane S2 that is also orthogonal to the surface-facing side 708 of the first leg 702. The first plane S1 and the second plane S2 are offset from each other by a distance D3 that is greater than a diameter D4 of the hole 912. With this arrangement, during installation of the bracket 900, a fastener can be inserted into the hole 912 without interfering with a fastener that is inserted into the slot 918a at the first position P1a. Thus, the offset between the slot 918a and the hole 912 can facilitate attachment of the bracket 900 to an object and a surface.

Figure 11:
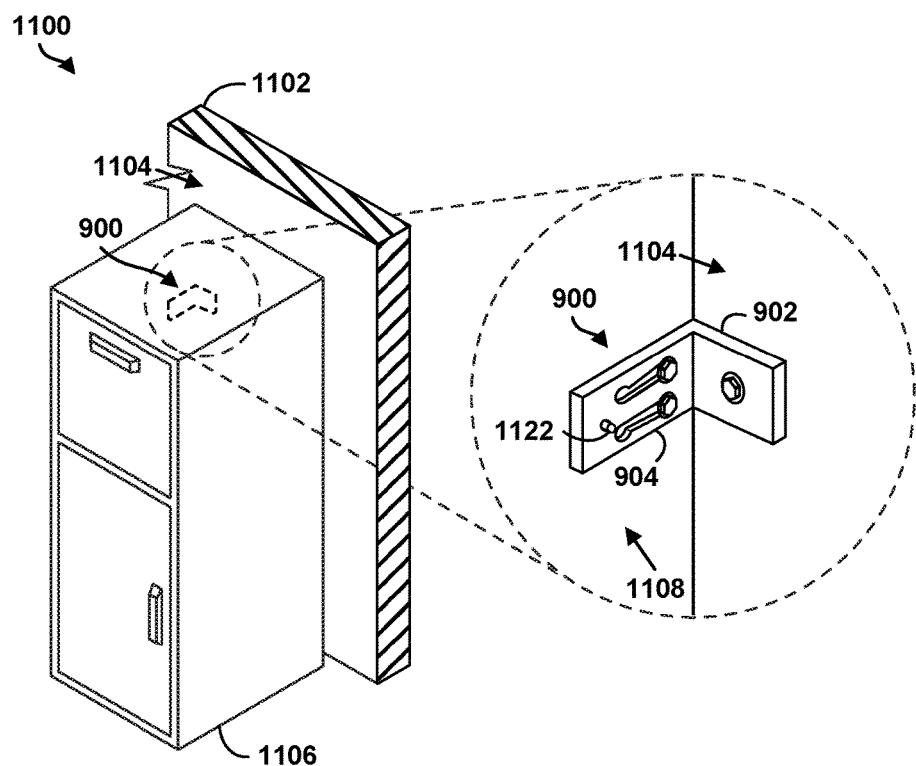
FIG. 11 illustrates a perspective view of an example assembly for a vehicle, including the example bracket of FIGS. 9 and 10.

The bracket 900 also differs from the bracket 100 of FIGS. 1-3 and 6-8 because the bracket 900 includes a hole 924 for receiving a shear pin, such as a shear pin 1122 (shown in FIG. 11). The hole 924 is configured to shear off at least a portion of the shear pin upon displacement of an object, such as the object 403 (shown in FIGS. 4 and 5), to which the second leg 904 is attached away from the surface that is flexing.

FIG. 11 illustrates a perspective view of an example assembly 1100 utilizing the bracket 900. Similarly to the assembly 600 of FIGS. 6-8, the assembly 1100 may be an assembly of a vehicle. Further, similarly to the assembly 600 of FIGS. 6-8, the assembly 1100 includes a partition 1102 having a surface 1104 to which the object 403 is attached. Unlike the assembly 600 of FIGS. 6-8, however, the object 403 is a stowage compartment 1106, rather than the occupant seat 606. The stowage compartment 1106 includes a structural portion 1108 for attaching the stowage compartment 1106 to the surface 1104.

As further shown in FIG. 11, the bracket 900 attaches the structural portion 1108 of the stowage compartment 1106 to the surface 1104 of the partition 1102. Specifically, the first leg 902 of the bracket 900 is attached to the surface 1104. Further, the second leg 904 of the bracket 900 is attached to the structural portion 1108. In this arrangement, a shear pin 1122 of the stowage compartment is received within the hole 924 of the second leg 904.

FIG. 12 shows a flowchart of an example method 1200 for attaching the object 403, such as the occupant seat 606 (shown in FIGS. 6-8) or the stowage compartment 1106 (shown in FIG. 11) to a surface of the partition 402 using a bracket, such as the bracket 100 (shown in FIGS. 1-3 and 6-8) or the bracket 900 (shown in FIGS. 9-11). The method 1200 shown in FIG. 12 presents an embodiment of a method that, for example, could be carried out by an operator and/or a robotic device. For instance, the method 1200 could be carried out while assembling the vehicle 400. Alternatively, the method 1200 could be carried out while replacing the object 403, such as the occupant seat 606 (shown in FIGS. 6-8) or the stowage compartment 1106 (shown in FIG. 11). Further, the bracket that is used could be any of the brackets 100 and/or 900 described herein. As described above, the bracket 100, 900 includes a first leg 102, 902 that is attachable to a surface of the partition 402 and a second leg 104, 904 that is attachable to the object 403 and extends from the first leg 102, 902 at a junction point 106, 906.

Referring to FIGS. 1-12, at block 1202, the method 1200 includes attaching a surface-facing side 108, 908 of the first leg 102, 902 to the surface 604, 1104. And at block 1204, the method 1200 includes attaching an object-facing side 114 of the second leg 104, 904 to the object 403 by inserting a fastener 612 through a slot 118, 918a, 918b that extends through the object-facing side 114 of the second leg 104, 904 and securing the object-facing side 114 of the second leg 104, 904 to the object 403.

As described above, along a length L of the slot 118, 918a, 918b, a width of the slot 118, 918a, 918b can taper from a first width W1 at a first position P1, P1a along the length of the slot 118, 918a, 918b to a second width W2 at a second position P2 along the length of the slot 118, 918a, 918b. The second width W2 can be narrower than the first width W1 and narrower than a diameter D1 of the fastener 612. In addition, the first position P1, P1a can be located between the junction point 106, 906 and the second position P2. Accordingly, inserting the fastener 612 through the slot 118, 918a, 918b can include inserting the fastener 612 through the slot 118, 918a, 918b at the first position P1, P1a along the length of the slot 118, 918a, 918b.

Optionally, at block 1202, FIG. 12 includes aligning an alignment component of the object 403 with a mating alignment component of the second leg 104, 904 prior to securing the object-facing side 114 of the second leg 104, 904 to the object 403.

In one example, the alignment component of the object can be a shear pin, such as the shear pin 1122 and the mating alignment component of the second leg 104, 904 can be a hole, such as the hole 924 (shown in FIGS. 9-11). Accordingly, aligning the alignment component of the object with the mating alignment component of the second leg 104, 9704 can include positioning the object-facing side 114 of the second leg 104, 904 against the object such that the shear pin 1122 is received within the hole 924.

In another example, the alignment component of the object can be a hole, such as the hole 614 (shown in FIG. 6), and the mating alignment component of the second leg 104, 904 can be a shear pin, such as the shear pin 122 (shown in FIG. 2). Accordingly, aligning the alignment component of the object with the mating alignment component of the second leg 104, 904 can include positioning the object-facing side 114 of the second leg 104, 904 against the object such that the shear pin 122 protrudes into the hole 614.

For this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A bracket for attaching an object to a surface, the bracket comprising:
    a first leg that is attachable to the surface, the first leg having a first free end and a surface-facing side; and
    a second leg that is attachable to the object and extends from the first leg at a junction point, the second leg having a second free end and an object-facing side,
    wherein the object-facing side comprises a slot extending through the object-facing side,
    wherein the slot is configured to receive a fastener for attaching the second leg to the object, and
    wherein along a length of the slot, a width of the slot tapers from a first width at a first position along the length of the slot to a second width at a second position along the length of the slot, the second width being narrower than the first width, and the first position being located between the junction point and the second position,
    wherein the surface is flexible and when the object is attached to the surface by the bracket, upon displacement of the object away from the surface due to a flexing of the surface, the slot is configured to be widened by the fastener as the fastener slides towards the second free end along the length of the slot, thereby dissipating force applied to the bracket.

2. The bracket of claim 1, wherein the slot is configured to receive the fastener at the first position along the length of the slot when the object is attached to the surface.

3. The bracket of claim 1, wherein the fastener has a diameter that is narrower than the first width and wider than the second width.

4. The bracket of claim 1, wherein the slot includes a widened end having a width that is wider than the second width, the widened end being located closer to the second free end than the junction point.

5. The bracket of claim 1, wherein the object comprises a shear pin protruding from a structural portion of the object, and wherein the object-facing side of the second leg comprises a hole configured to align with the shear pin when the object is attached to the second leg.

6. The bracket of claim 1, wherein a structural portion of the object comprises a hole, and wherein the object-facing side of the second leg comprises a shear pin that is configured to align with the hole when the object is attached to the second leg.

7. The bracket of claim 1, wherein the surface-facing side of the first leg comprises a hole extending through the surface-facing side that is configured to receive another fastener for attaching the first leg to the surface.

8. The bracket of claim 7, wherein the hole is arranged within a first plane that is orthogonal to the surface-facing side, and wherein the first position along the length of the slot is arranged within a second plane that is orthogonal to the surface-facing side, the first plane and the second plane being offset from each other by a distance that is greater than a diameter of the hole.

9. The bracket of claim 1, wherein the first leg is orthogonal to the second leg.

10. The bracket of claim 1, wherein a distance between the first position along the length of the slot and the second position along the length of the slot is greater than the first width.

11. A bracket for attaching an object to a surface, the bracket comprising:
a first leg that is attachable to the surface, the first leg having a first free end and a surface-facing side; and
a second leg that is attachable to the object and extends from the first leg at a junction point, the second leg having a second free end and an object-facing side,
wherein the object-facing side comprises a slot extending through the object-facing side,
wherein the slot is configured to receive a fastener for attaching the second leg to the object,
wherein along a length of the slot, a width of the slot tapers from a first width at a first position along the length of the slot to a second width at a second position along the length of the slot, the second width being narrower than the first width, and the first position being located between the junction point and the second position,
wherein the object comprises a shear pin protruding from a structural portion of the object, and wherein the object-facing side of the second leg comprises a hole configured to align with the shear pin when the object is attached to the second leg, and
wherein the surface is on a partition that is flexible, and wherein the hole is configured to shear off at least a portion of the shear pin upon displacement of the object away from the surface due to a flexing of the partition.

12. A bracket for attaching an object to a surface, the bracket comprising:
a first leg that is attachable to the surface, the first leg having a first free end and a surface-facing side; and
a second leg that is attachable to the object and extends from the first leg at a junction point, the second leg having a second free end and an object-facing side,
wherein the object-facing side comprises a slot extending through the object-facing side,
wherein the slot is configured to receive a fastener for attaching the second leg to the object,
wherein along a length of the slot, a width of the slot tapers from a first width at a first position along the length of the slot to a second width at a second position along the length of the slot, the second width being narrower than the first width, and the first position being located between the junction point and the second position,
wherein a structural portion of the object comprises a hole, and wherein the object-facing side of the second leg comprises a shear pin that is configured to align with the hole when the object is attached to the second leg, and
wherein the surface is on a partition that is flexible and the shear pin is configured to be sheared off of the object-facing side of the second leg upon displacement of the object away from the surface due to a flexing of the partition.

13. An assembly for a vehicle, the assembly comprising:
a partition having a surface;
an object having a structural portion; and
a bracket attaching the structural portion of the object to the partition, the bracket comprising:
a first leg that is attachable to the surface of the partition, the first leg having a first free end and a surface-facing side, and
a second leg that is attachable to the structural portion of the object and extends from the first leg at a junction point, the second leg having a second free end and an object-facing side,
wherein the object-facing side comprises a slot extending through the object-facing side,
wherein the slot is configured to receive a fastener for attaching the second leg to the structural portion of the object, and
wherein along a length of the slot, a width of the slot tapers from a first width at a first position along the length of the slot to a second width at a second position along the length of the slot, the second width being narrower than the first width, and the first position being located between the junction point and the second position.

14. The assembly of claim 13, wherein the partition is flexible and, upon displacement of the object away from the surface due to a flexing of the partition, the slot is configured to be widened by the fastener as the fastener slides towards the second free end along the length of the slot, thereby dissipating force applied to the bracket.

15. The assembly of claim 13, wherein the object is an occupant seat.

16. The assembly of claim 13, wherein the object is a stowage compartment.

17. The assembly of claim 13, wherein the structural portion is oriented perpendicular to the surface of the partition.

18. A method for attaching a structural portion of an object to a partition in a vehicle using a bracket, wherein the bracket comprises a first leg that is attachable to a surface of the partition and a second leg that is attachable to the structural portion of the object and extends from the first leg at a junction point, the method comprising:
attaching a surface-facing side of the first leg to the surface of the partition; and
attaching an object-facing side of the second leg to the structural portion of the object by inserting a fastener through a slot that extends through the object-facing side of the second leg and securing the object-facing side of the second leg to the structural portion of the object,
wherein along a length of the slot, a width of the slot tapers from a first width at a first position along the length of the slot to a second width at a second position along the length of the slot, the second width being narrower than the first width and narrower than a diameter of the fastener, and the first position being located between the junction point and the second position.

19. The method of claim 18, wherein attaching the object-facing side of the second leg to the structural portion of the object further comprises aligning an alignment component of the object with a mating alignment component of the second leg prior to securing the object-facing side of the second leg to the structural portion of the object.

* * * * *